United States Patent
Nannetti

(10) Patent No.: US 10,384,815 B2
(45) Date of Patent: Aug. 20, 2019

(54) FEEDING ASSEMBLY TO FILL CAPSULES OR THE LIKE WITH AT LEAST TWO PRODUCTS, IN PARTICULAR PHARMACEUTICAL PRODUCTS, IN GRANULES

(71) Applicant: MG 2—S.r.l., Pianoro (IT)

(72) Inventor: Davide Nannetti, Quarto Inferiore (IT)

(73) Assignee: MG2-S.R.L., Pianoro (IT)

( * ) Notice: Subject to any disclaimer, the term of this patent is extended or adjusted under 35 U.S.C. 154(b) by 240 days.

(21) Appl. No.: 15/215,318

(22) Filed: Jul. 20, 2016

(65) Prior Publication Data
US 2017/0021949 A1  Jan. 26, 2017

(30) Foreign Application Priority Data
Jul. 24, 2015  (IT) .................. 102015000038182

(51) Int. Cl.
*B65B 1/06* (2006.01)
*A61J 3/07* (2006.01)
*F16K 11/065* (2006.01)

(52) U.S. Cl.
CPC .................. *B65B 1/06* (2013.01); *A61J 3/07* (2013.01); *A61J 3/074* (2013.01); *F16K 11/0655* (2013.01); *A61J 2200/74* (2013.01)

(58) Field of Classification Search
CPC .... A61J 3/07; A61J 3/071; A61J 3/072; A61J 3/074; F16K 11/0655; B65B 1/06; B65B 1/08; B65B 1/10; B65B 1/14
See application file for complete search history.

(56) References Cited

U.S. PATENT DOCUMENTS

| | | | | |
|---|---|---|---|---|
| 3,258,159 A | * | 6/1966 | Neville, Jr. ............... | A61J 3/07 222/1 |
| 3,628,629 A | * | 12/1971 | Phillips .................... | F01L 1/14 184/6.17 |
| 4,884,602 A | * | 12/1989 | Yamamoto .............. | A61J 3/074 141/235 |
| 5,971,037 A | * | 10/1999 | Ansaloni ................. | A61J 3/074 141/100 |
| 2007/0169836 A1 | * | 7/2007 | Djurle ...................... | B65B 1/32 141/83 |

(Continued)

FOREIGN PATENT DOCUMENTS

| | | |
|---|---|---|
| DE | 202013005759 | 7/2013 |
| DE | 202013005759 U1 * 7/2013 ............. A61J 3/074 |

(Continued)

OTHER PUBLICATIONS

Italian Search Report (dated Apr. 12, 2016) for Corresponding Application No. IT 102015000038182; Written Opinion.

*Primary Examiner* — Andrew D StClair
(74) *Attorney, Agent, or Firm* — Gottlieb, Rackman & Reisman, P.C.

(57) ABSTRACT

The bottom of a capsule is filled with at least two products contained in respective annular rotating containing tanks, which are mounted concentrically, and have a plurality of pairs of radially aligned filling holes; the filling holes of each pair of filling holes being associated with a relative closing device, which is selectively movable between a closing position of both filling holes, a first opening position of one of the two filling holes, and a second opening position of the other filling hole.

19 Claims, 8 Drawing Sheets

(56) References Cited

U.S. PATENT DOCUMENTS

| | | | | |
|---|---|---|---|---|
| 2008/0256908 A1* | 10/2008 | Frabetti | ................... | A61J 3/074 53/502 |
| 2011/0146839 A1* | 6/2011 | Ansaloni | ................. | A61J 3/074 141/129 |
| 2011/0146841 A1* | 6/2011 | Ansaloni | ................. | A61J 3/074 141/168 |

FOREIGN PATENT DOCUMENTS

| | | | |
|---|---|---|---|
| GB | 2028953 | * | 3/1980 |
| WO | 2010070592 | | 6/2010 |
| WO | 2013026848 | | 2/2013 |
| WO | WO2013168086 | | 11/2013 |

* cited by examiner

FEEDING ASSEMBLY TO FILL CAPSULES OR THE LIKE WITH AT LEAST TWO PRODUCTS, IN PARTICULAR PHARMACEUTICAL PRODUCTS, IN GRANULES

The present invention relates to a feeding assembly to fill capsules or the like with at least two products.

In particular, the present invention relates to a feeding assembly to fill capsules or the like with pharmaceutical products in granules, to which the following argumentation will make explicit reference without loosing its generality.

BACKGROUND OF THE INVENTION

In the pharmaceutical field, a feeding assembly is known of the type comprising a containing tank, which houses, on the inside, a pharmaceutical product in granules, has an annular shape, is mounted so as to rotate around a substantially vertical rotation axis, and is delimited by a bottom wall provided with a plurality of filling holes, which are uniformly distributed around the rotation axis.

The feeding assembly comprises, furthermore, a pocket conveyor, which is moved forward continuously along a given path, extends beneath the containing tank, and is provided with a plurality of pockets, each of which is configured to take and hold a bottom of a capsule, and is moved forward by the pocket conveyor, in phase with a relative filling hole.

Generally, the filling holes are closed at the bottom by an annular disc, which is mounted between the containing tank and the pocket conveyor, and has an opening made through the annular disc, at a filling station, to allow the granules to fall inside the relative bottoms.

The above described known feeding assemblies present a number of drawbacks deriving principally from the fact that these feeding assemblies are configured to feed a single pharmaceutical product in granules into the bottoms of the capsules and are, therefore, unable to fill the capsules with at least two different pharmaceutical products in granules.

SUMMARY OF THE INVENTION

It is the object of the present invention to provide a feeding assembly to fill capsules or the like with at least two products, which is without the aforesaid drawbacks.

According to the present invention, there is provided a feeding assembly to fill capsules or the like with at least two products as claimed in the appended claims.

BRIEF DESCRIPTION OF THE DRAWINGS

The present invention will now be described with reference to the accompanying drawings, which show a non-limiting embodiment, wherein.

DETAILED DESCRIPTION OF THE INVENTION

Figure 1:
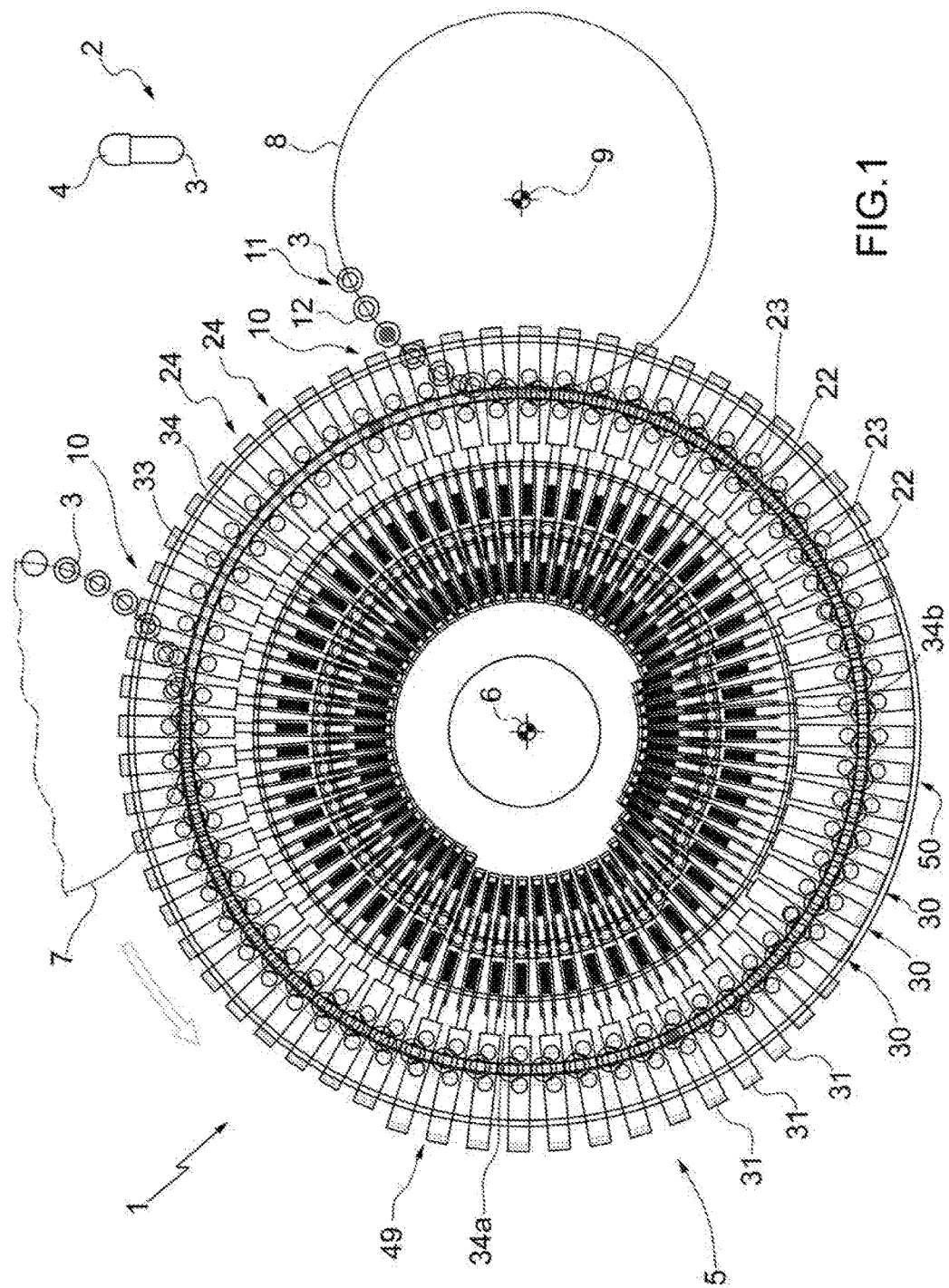
FIG. 1 shows a schematic, plan view, with parts removed for clarity, of a preferred embodiment of the feeding assembly of the present invention.

With reference to FIG. 1, numeral 1 indicates a feeding assembly, as a whole, to fill capsules 2 of a known type with two pharmaceutical products in granules.

Each capsule 2 comprises a bottom 3, which is substantially cup-shaped and a lid 4 to close the bottom 3.

The feeding assembly 1 comprises a filling wheel 5, which is mounted to rotate continuously around a substantially vertical rotation axis 6, and is connected with a wheel 7 to enter the bottoms 3 in the wheel 5 and with a wheel 8 to exit the bottoms 3 from the wheel 5.

The wheels 7, 8 are mounted so as to rotate continuously around respective rotation axes 9, which are parallel to the axis 6, and are connected to the wheel 5 at respective transfer stations 10.

Furthermore, the feeding assembly 1 comprises a pocket conveyor 11 provided with a plurality of pockets 12, which are substantially cup-shaped, with the concavity facing upwards; they are uniformly distributed along the conveyor 11 and are each suitable for holding a respective bottom 3 with the concavity facing upwards; they are moved in sequence by the conveyor 11 along a loop path P (only part of which is shown in FIG. 1) extending around the axes 6 and 9.

In accordance with what is shown in the figures from 2 to 7, the wheel 5 comprises a support disc 13, which is coaxial to the axis 6; and two annular shaped containing tanks 14, 15, which are mounted above the disc 13; they are concentric to each other and also concentric to the axis 6, and each houses, on the inside, a respective pharmaceutical product in granules.

Each tank 14, 15 has a substantially transversal U-section, and is delimited by a bottom wall 16, 17 that is substantially perpendicular to the axis 6, and is provided with a plurality of filling holes 18, 19 which are made through the relative wall 16, 17 parallel to the axis 6; they are uniformly distributed around the axis 6, and each is axially aligned to a respective filling hole 20, 21 made through the disc 13.

The tanks 14, 15 are coupled in an angularly fixed manner to the disc 13 so as to rotate around the axis 6, and they are coupled, furthermore, in a sliding manner to the disc 13 to move, in relation to the disc 13, parallel to the axis 6 and allow each hole 18, 19 to define, together with the relative hole 20, 21, a relative variable volume filling chamber 22, 23.

Each chamber 22 is radially aligned with a corresponding chamber 23 so as to define a pair 24 of corresponding chambers 22, 23.

Figure 7:
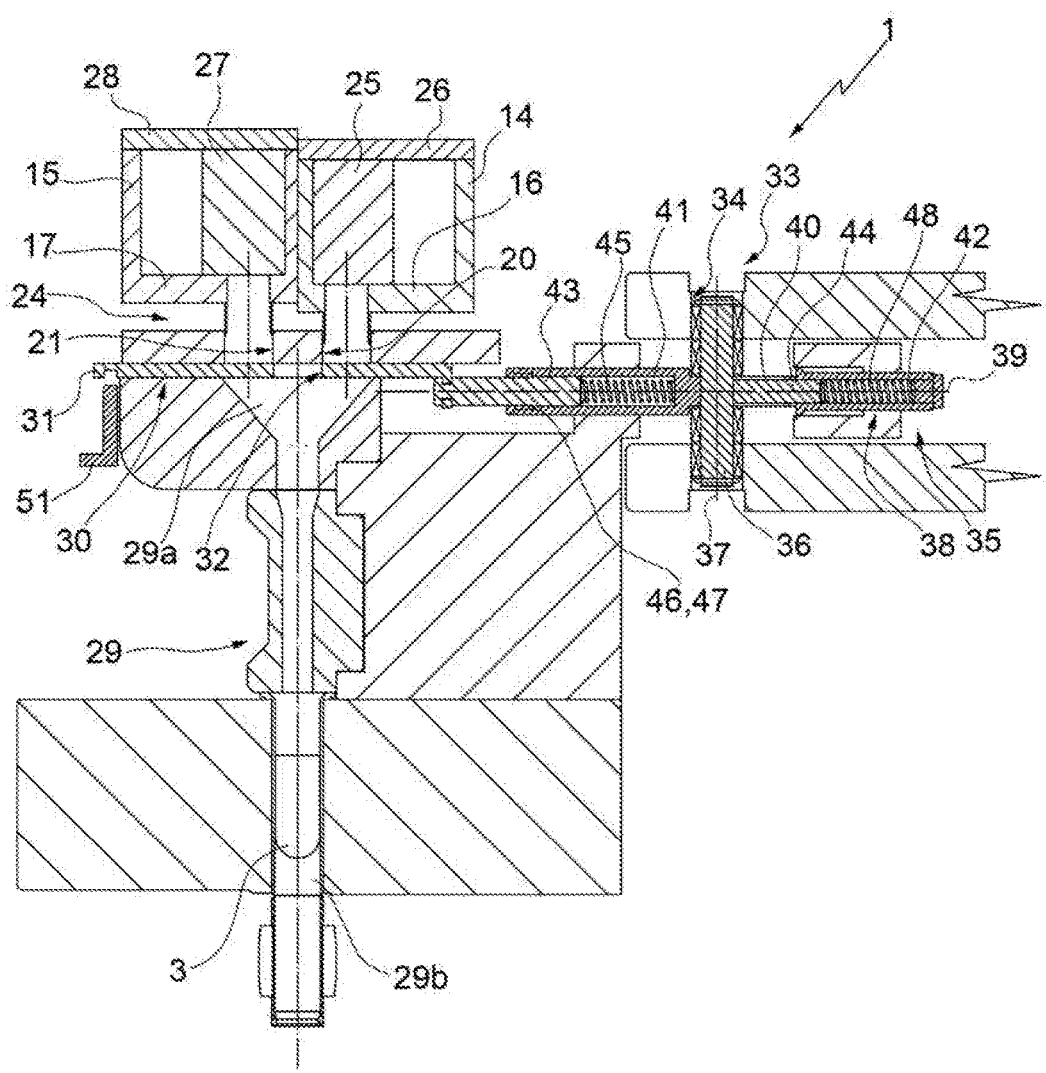

Following the rotation of the wheel 5 around the axis 6, the chambers 22 are closed at the top, in sequence, by a shaving block 25 protruding downwards from a closing lid 26 of the tank 14, and the chambers 23 are closed at the top in sequence, by a shaving block 27 protruding downwards from a closing lid 28 of the tank 15 (FIG. 7).

Furthermore, for each pair 24 of chambers 22, 23, the wheel 5 comprises a respective feeding channel 29, which extends beneath the disc 13 to feed the relative pharmaceutical products in granules from the relative chambers 22, 23 into the relative bottom 3, and a respective closing device 30, interposed between the chambers 22, 23 and the channel 29, to close the chambers 22, 23 at the bottom.

Each channel 29 comprises an ingoing section 29a, which is funnel-shaped converging downwards, facing the chambers 22, 23 of the relative pair 24 of chambers 22, 23; and a substantially cylindrical outgoing section 29b facing a relative pocket 12 and, therefore, a relative bottom 3.

Each device 30 comprises a flat shutter 31 that is mounted between the disc 13 and the relative channel 29, which is rectangular and provided with a central hole 32 made through the shutter 31 parallel to the axis 6.

Each shutter 31 is radially moveable between a closing position (FIG. 2), wherein the hole 32 is set between the relative chambers 22, 23 to allow the shutter 31 to close the chambers 22, 23 at the bottom, a first opening position (FIG. 4), wherein the hole 32 is axially aligned to the relative chamber 22 to allow the shutter 31 to open the relative chamber 22 and close the relative chamber 23, and a second opening position (FIG. 3), wherein the hole 32 is axially aligned to the relative chamber 23 to allow the shutter 31 to open the relative chamber 23 and close the relative chamber 22.

The shutters 31 are moved between the relative closing positions, the relative first opening positions, and the relative second opening positions by an operating device 33 comprising a cam 34 extending around the axis 6 and, for each shutter 31, a respective tappet 35 coupled to the cam 34.

Figure 8:
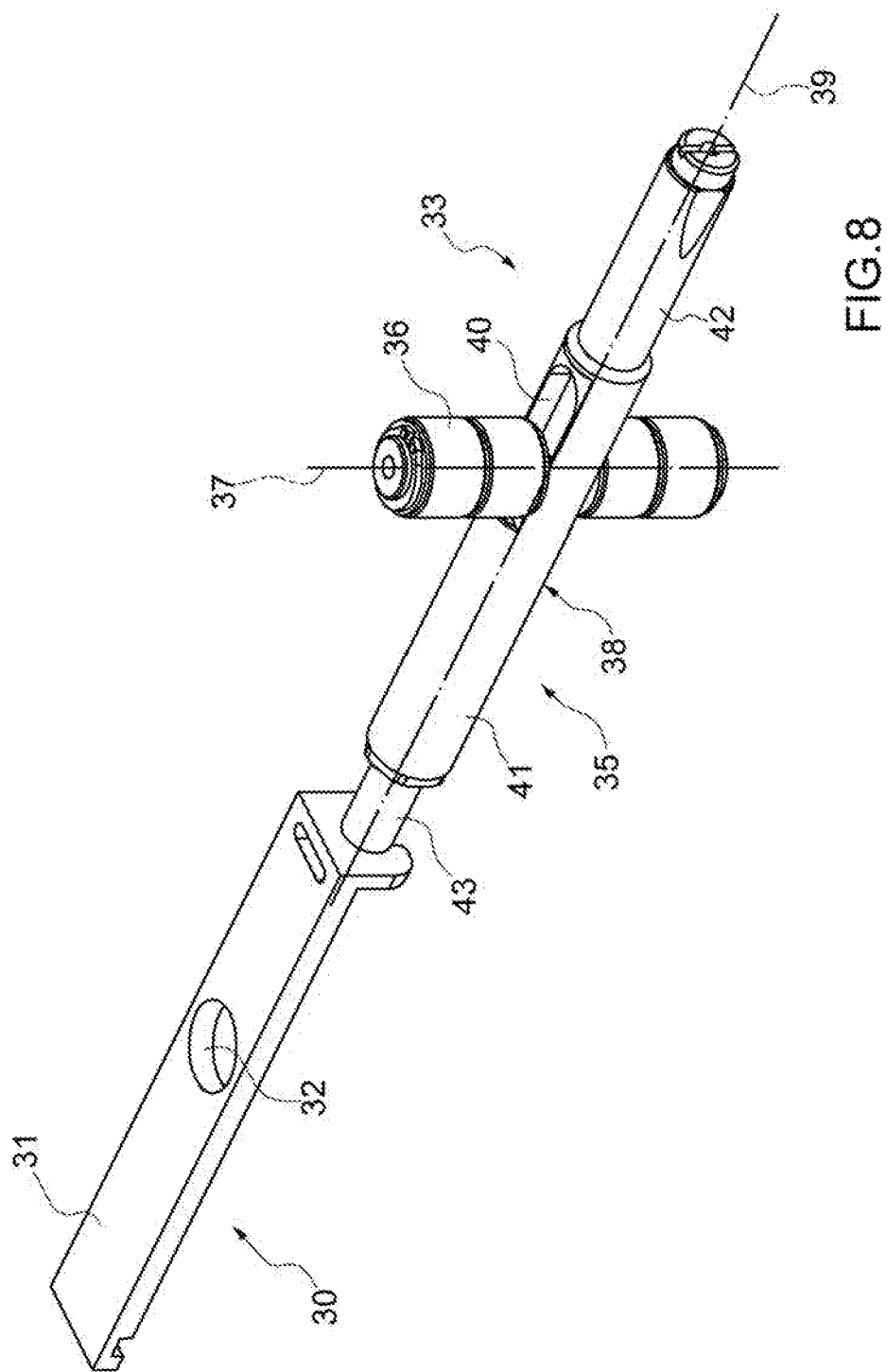
FIG. 8 shows a perspective view of a detail of the feeding assembly in FIG. 1.

Each tappet 35 comprises a tappet roller 36, which has a longitudinal axis 37 parallel to the axis 6, and is engaged in the cam 34; and a support bar 38, which has a longitudinal axis 39 transversal to the axis 37, and is provided with a central hole 40 (FIG. 8) engaged in a sliding manner by the roller 36.

The bar 38 comprises, furthermore, two cylindrical sleeves 41, 42, which are set by opposite bands of the roller 36, coaxial to the axis 39.

The sleeve 41 faces the shutter 31, and is engaged in a sliding manner by a coupling pin 43 connected to the shutter 31; and the sleeve 42 is engaged in a sliding manner by a thrust pin 44 and a spring 45, interposed between the bar 38 and the pin 44, to keep the pin 44 in contact with the roller 36.

The pin 43 has an annular shoulder 46, made at an intermediate point of its external surface perpendicularly to the axis 39, and is moved and normally kept in contact with an annular shoulder 47 made on the internal surface of the sleeve 41 by a spring 48 interposed between the bar 38 and the pin 43.

The working of the feeding assembly 1 will now be described, with reference to the drawings from 2 to 7, taking into consideration just one pair 24 of filling chambers 22, 23, and starting from a point in which the relative shutter 31 is set in its closing position (FIG. 2) and the relative feeding channel 29 is moved forward through the transfer station 10 between the wheels 5 and 7, in phase with a relative bottom 3.

Following the rotation of the wheel 5 around the axis 6, first the chambers 22, 23 are filled with the relative pharmaceutical products in granules contained in the relative tanks 14, 15 and, therefore, closed at the top by the relative shaving blocks 25, 27.

Figure 3:
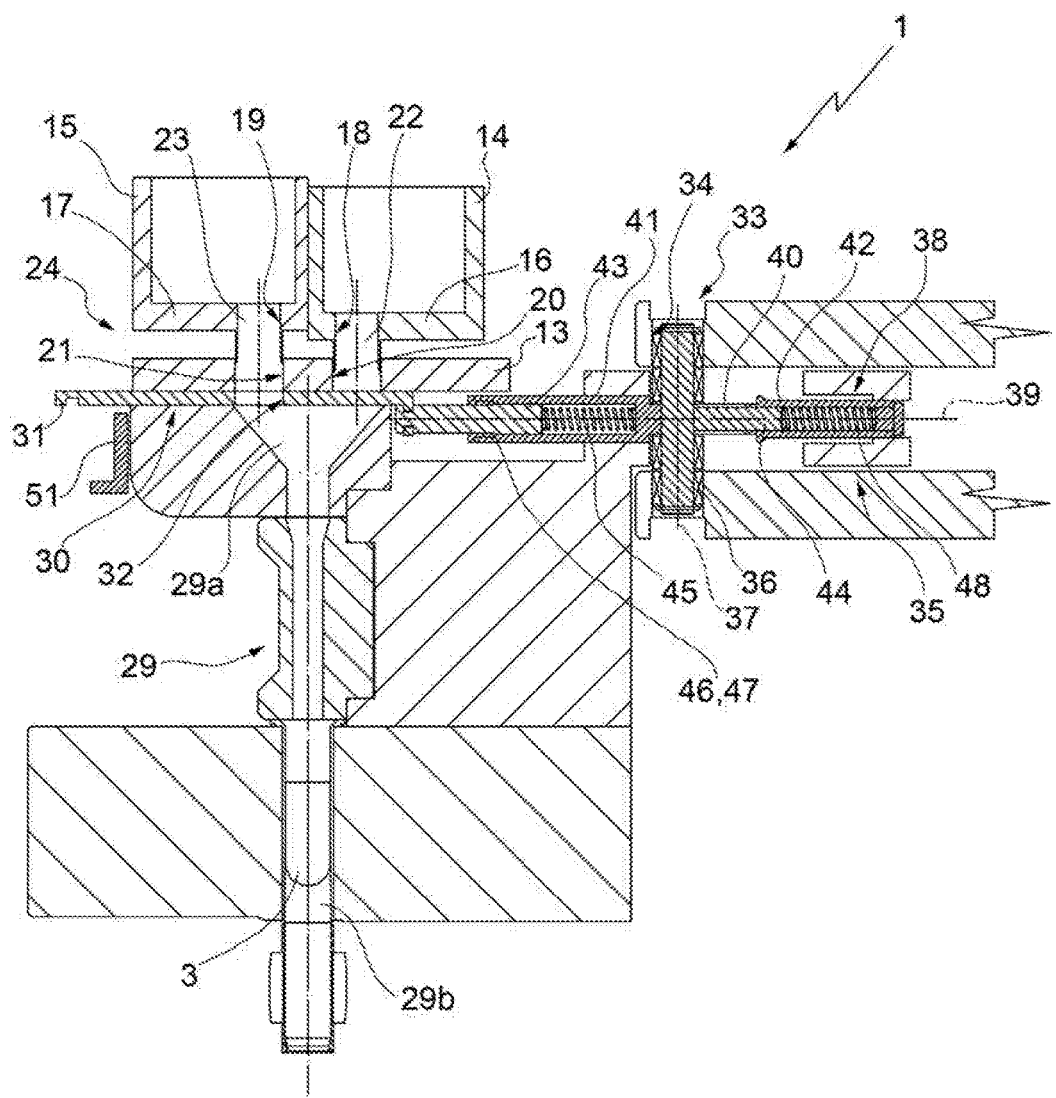

At a first filling station 49, the cam 34 has a first section 34a configured so as to move the shutter 31 from its closing position into its second opening position and allow the pharmaceutical product in granules contained in the chamber 23 to fall by gravity firstly along the relative channel 29 and then inside the relative bottom 3 (FIG. 3).

At a second filling station 50, the cam 34 has a second section 34b configured so as to move the shutter 31 from its second opening position into its first opening position and allow the pharmaceutical product in granules contained in the chamber 22 to fall by gravity firstly along the relative channel 29 and then inside the relative bottom 3 (drawing 4).

Once the bottom 3 is full, the shutter 31 is moved again from the cam 34 into its closing position and the bottom 3 containing the two pharmaceutical products in granules is moved forward firstly through the transfer station 10 between the wheels 5 and 8 and then around the axis 9 of the wheel 8.

Figure 2:
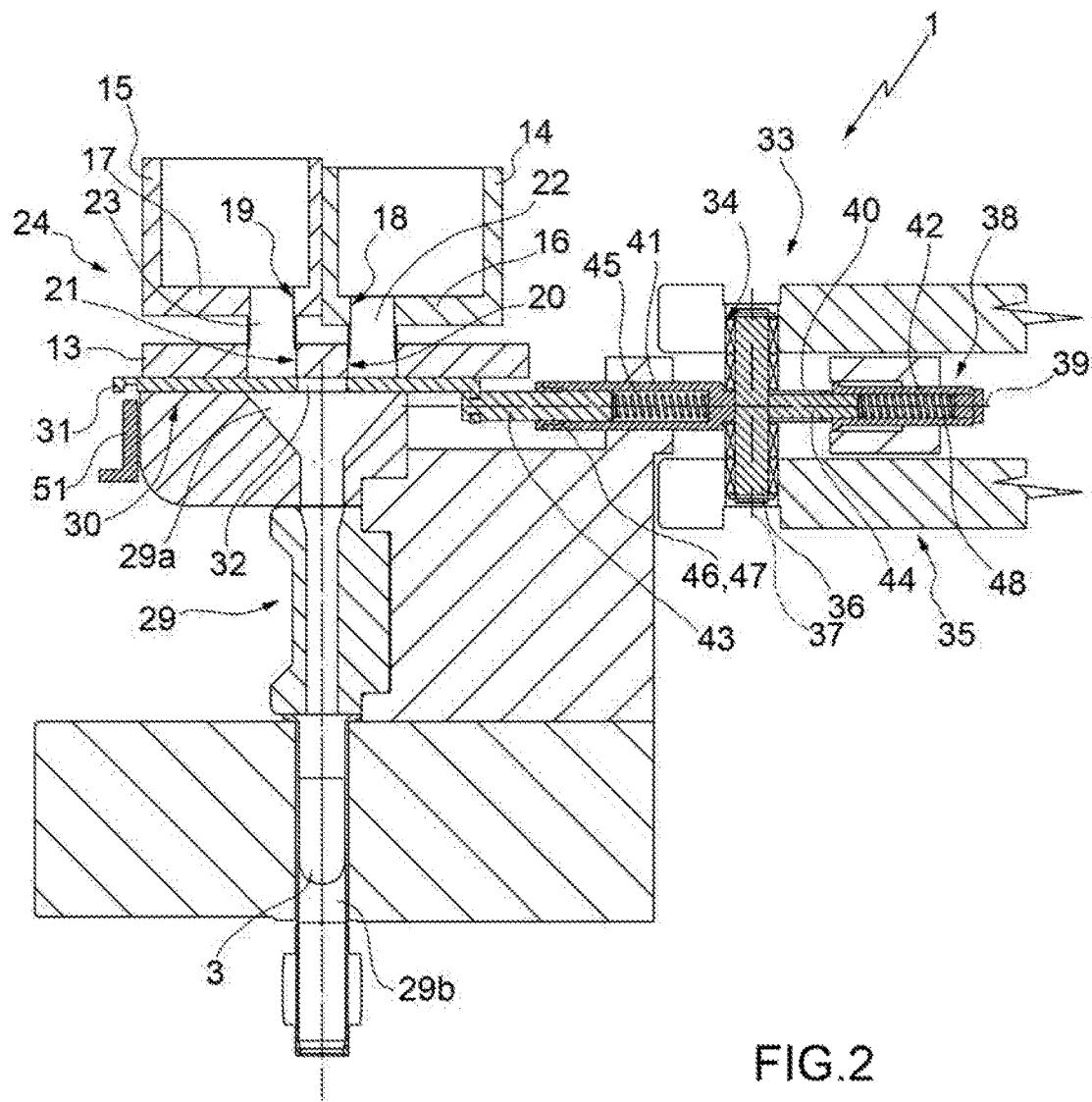
FIGS. 2 to 7 show the feeding assembly in FIG. 1, schematically, in lateral elevation, with parts in section and parts removed for clarity, in different operating positions.
Figure 4:
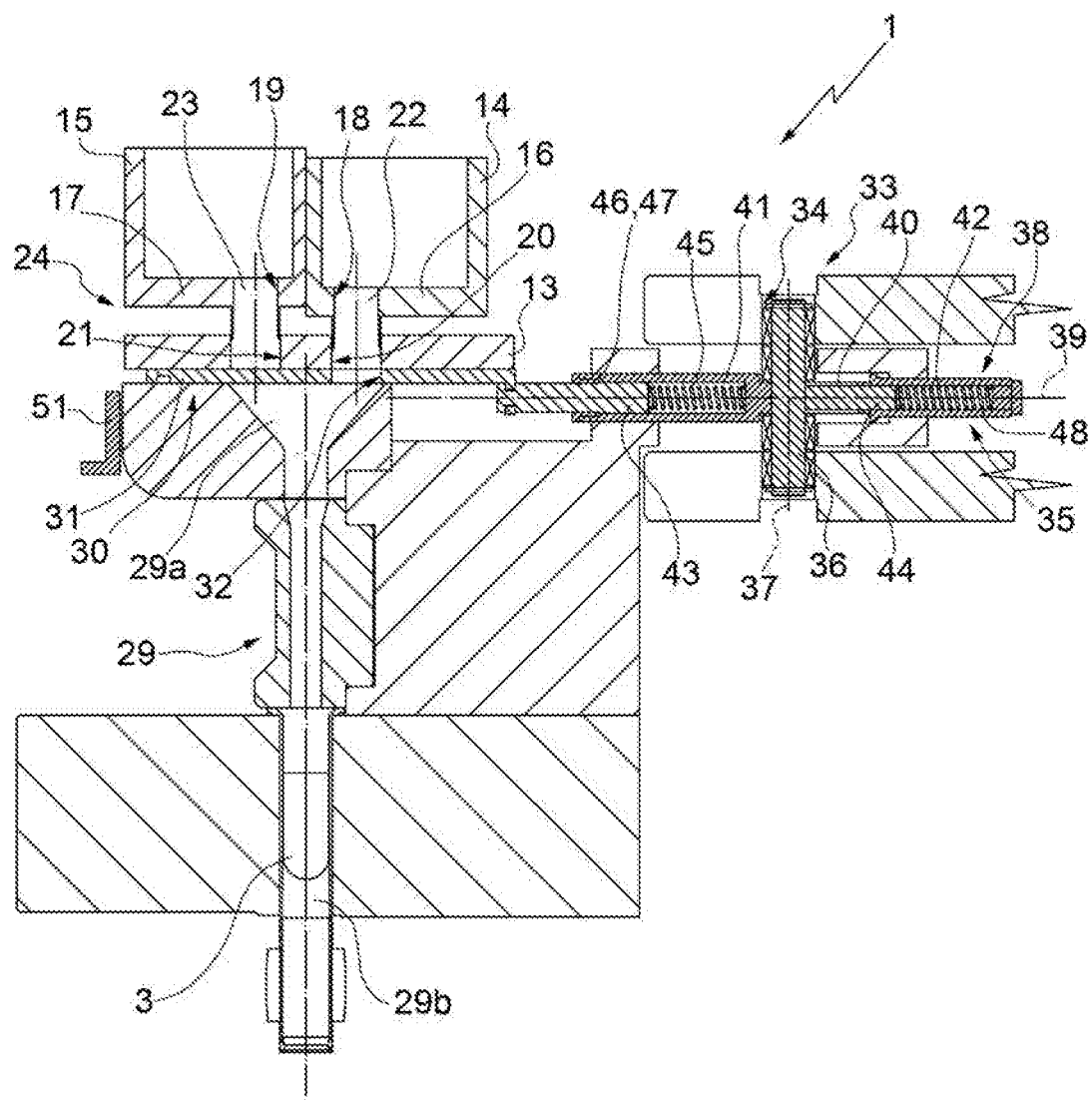

Each shutter 31 is associated with a relative locking device 51, which is selectively movable between a locking position (FIGS. 5 and 6), wherein the shutter 31 is locked in its closing position to prevent the filling of the pharmaceutical products in granules inside the relative channel 29, and a release position (FIGS. 2, 3, and 4).

Figure 5:
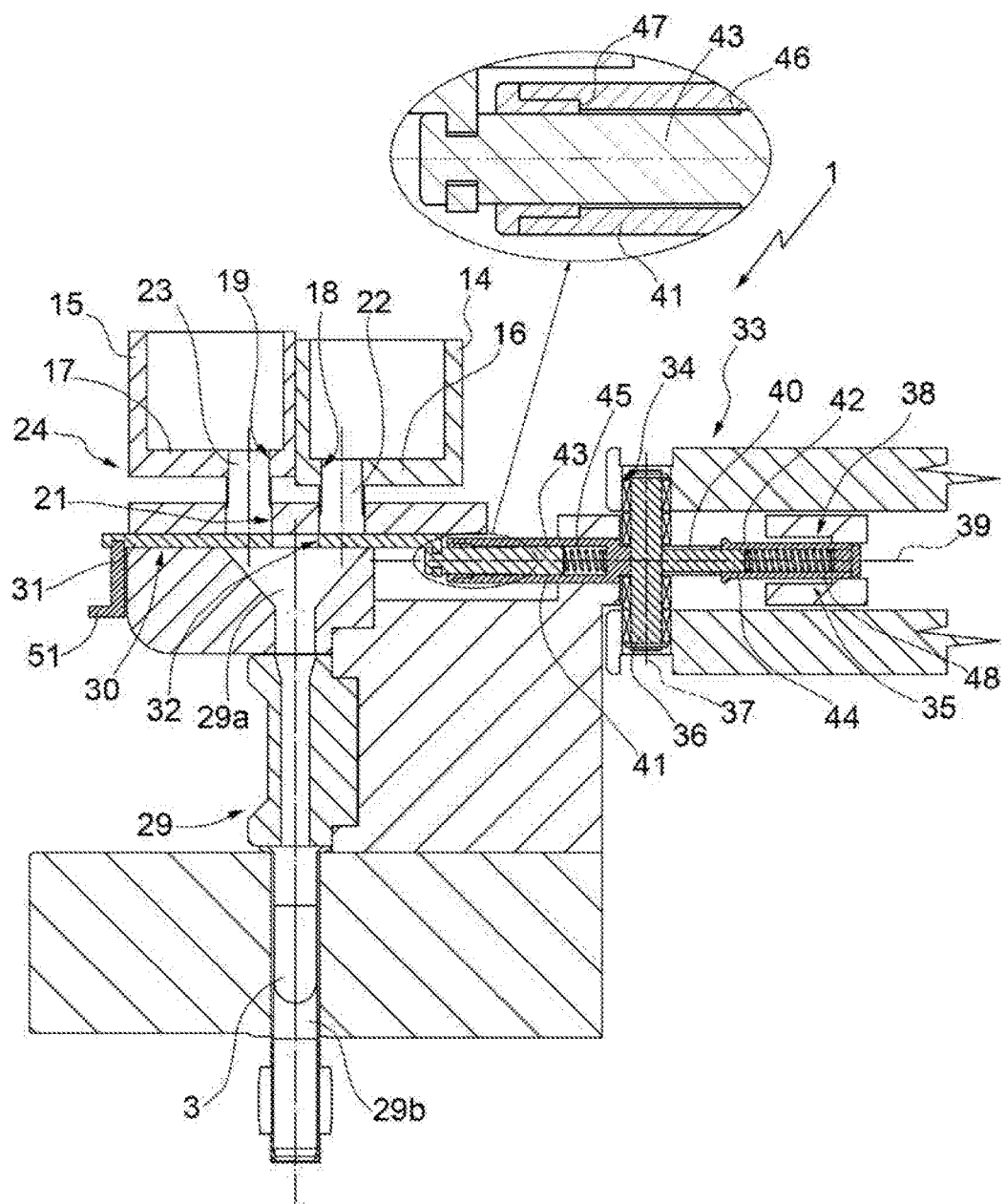

When the shutter 31 is locked in its closing position to prevent the filling of the pharmaceutical product in granules contained in the tank 15 and the roller 36 engages the section 34a of the cam 34, the support bar 38 runs along the coupling pin 43 against the thrust of the spring 45 (FIG. 5).

Figure 6:
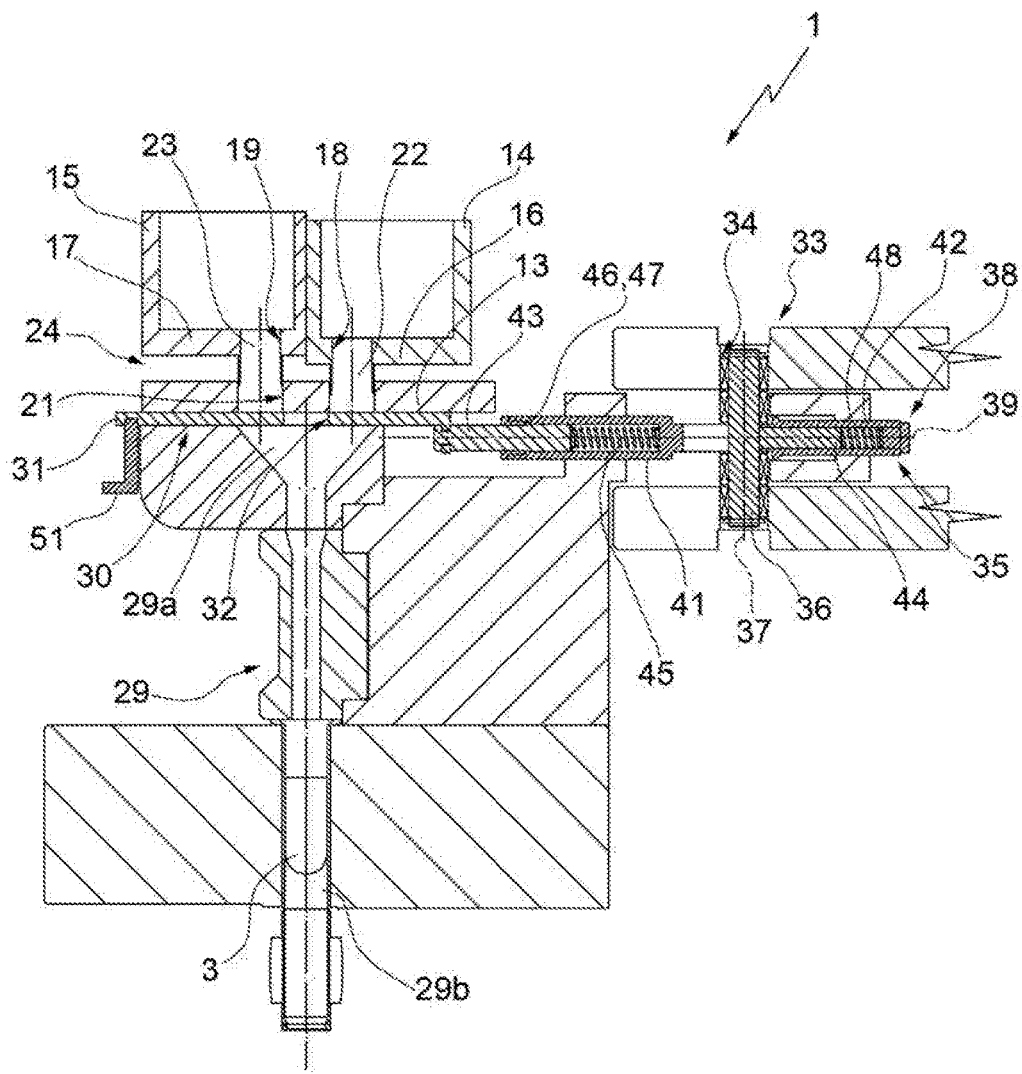

When the shutter 31 is locked in its closing position to prevent the filling of the pharmaceutical product in granules contained in the tank 14 and the roller 36 engages the section 34b of the cam 34, the support bar 38 moves radially towards the axis 6, the sleeve 41 and the pin 43 come into contact, at the shoulders 46, 47 under the thrust of the spring 45, and the roller 36 engages the hole 40 in a sliding manner against the thrust of the spring 48 (FIG. 6).

The feeding assembly 1 therefore presents a number of advantages principally deriving from the fact that:

the presence of the two tanks 14, 15 makes it possible to feed two different pharmaceutical products in granules inside each bottom 3; and the configuration of the tappets 35 makes it possible to selectively prevent the feeding inside the bottoms 3 of the pharmaceutical products in granules contained in the tanks 14 and/or 15.

The invention claimed is:

1. A feeding assembly to fill capsules (2) or the like with at least two products, each capsule (29) comprising a respective bottom (3) and a respective lid (4) to close the bottom (3), the feeding assembly comprising:

a first containing tank (14), which is capable of housing, on the inside, a first product, has an annular shape, is mounted so as to rotate around a rotation axis (6), and is delimited by a bottom wall (16) provided with a plurality of first filling holes (22) uniformly distributed around the rotation axis (6); and a pocket conveyor (11) to move forward, in sequence, a plurality of said bottoms (3) in phase, a second containing tank (15), which is capable of housing, on the inside, a second product, has an annular shape that is concentric to the first containing tank (14), is mounted so as to rotate around the rotation axis (6), and is delimited by a bottom wall (17) provided with a plurality of second filling holes (23), which are uniformly distributed around the rotation axis (6);

each of said second filling holes defining, together with a corresponding first filling hole (22), a pair (24) of filling holes (22, 23); and, for each pair (24) of filling holes (22, 23), a respective shutter (31), which is selectively movable between a closing position of both the filling holes (22, 23), a first opening position of the first filling hole (22), and a second opening position of the second filling hole (23), and wherein said assembly comprises, for each shutter (31), a locking device to lock the closing device (30) in its closing position.

2. The feeding assembly according to claim 1, wherein each first filling hole (22) is radially aligned with the corresponding second filling hole (23).

3. The feeding assembly according to claim 1, wherein the shutters (31) are mounted beneath the bottom walls (16, 17) of said first and second containing tank (14, 15).

4. The feeding assembly according to claim 1, wherein each shutter (31) is moveable radially between the closing position and said first and second opening position.

5. The feeding assembly according to claim 1 further comprising, an operating device (33) to move the shutters (31) between the relative closing positions and the relative first and second opening position.

6. The feeding assembly according to claim 5, wherein the operating device (33) comprises a cam (34) and, for each shutter (31), a respective tappet (35) engaged in the cam (34).

7. The feeding assembly according to claim 6, wherein each tappet (35) comprises a support bar (38) mounted transversally to the rotation axis (6), and a tappet roller (36), which has a longitudinal axis (37) parallel to the rotation axis (6), is mounted through the support bar (38), and is engaged in the cam (34).

8. The feeding assembly according to claim 7, wherein the support bar (38) has a hole (40) engaged in a sliding manner by the tappet roller (36).

9. A feeding assembly to fill capsules (2) or the like with at least two products, each capsule (29) comprising a respective bottom (3) and a respective lid (4) to close the bottom (3),
the feeding assembly comprising:
a first containing tank (14), which is capable of housing on the inside, a first product, has an annular shape, is mounted so as to rotate around a rotation axis (6), and is delimited by a bottom wall (16) provided with a plurality of first filling holes (22) uniformly distributed around the rotation axis (6); and a pocket conveyor (11) to move forward, in sequence, a plurality of said bottoms (3) in phase,
a second containing tank (15), which is capable of housing, on the inside, a second product, has an annular shape that is concentric to the first containing tank (14), is mounted so as to rotate around the rotation axis (6), and is delimited by a bottom wall (17) provided with a plurality of second filling holes (23), which are uniformly distributed around the rotation axis (6);
each of said second filling holes defining, together with a corresponding first filling hole (22), a pair (24) of filling holes (22, 23); and, for each pair (24) of filling holes (22, 23), a shutter (31), which is selectively movable between a closing position of both the filling holes (22, 23), a first opening position of the first filling hole (22), and a second opening position of the second filling hole (23)
an operating device (33) to move the shutters (31) between the relative closing positions and the relative first and second opening position;
wherein the operating device (33) comprises a cam (34) and, for each shutter (31), a respective tappet (35) engaged in the cam (34);
wherein each tappet (35) comprises a support bar (38) mounted transversally to the rotation axis (6), and a tappet roller (36), which has a longitudinal axis (37) parallel to the rotation axis (6), is mounted through the support bar (38), and is engaged in the cam (34);
wherein the cam (34) comprises a first section (34a) to move the shutters (31) into their second opening positions and a second section (34b) to move the shutters (31) into their first opening positions; and
further comprising, for each shutter (31), a respective locking device (51) movable between a locking position of the shutter (31) in its closing position, and a release position.

10. The feeding assembly according to claim 9, wherein each first filling hole (22) is radially aligned with the corresponding second filling hole (23).

11. The feeding assembly according to claim 9, wherein the shutters (31) are mounted beneath the bottom walls (16, 17) of said first and second containing tank (14, 15).

12. The feeding assembly according to claim 9, wherein each shutter (31) is moveable radially between the closing position and said first and second opening position.

13. The feeding assembly according to claim 9, wherein the support bar (38) has a hole (40) engaged in a sliding manner by the tappet roller (36).

14. The feeding assembly according to claim 9, wherein the support bar (38) has two sleeves (41, 42) obtained from opposite bands of the tappet roller (36) and disposed coaxially to a longitudinal axis (39) of the support bar (38).

15. The feeding assembly according to claim 14, wherein a first sleeve (41) of the support bar (38) houses, on its inside, a first spring (45), interposed between the support bar (38) and the shutter (31), to allow the support bar (38) and the shutter (31) to move in relation to each other when the locking device (51) is set in a locking position and the tappet roller (36) engages the first section (34a) of the cam (34).

16. The feeding assembly according to claim 14, wherein a second sleeve (42) of the support bar (38) houses, on its inside, a second spring (48), interposed between the support bar (38) and the tappet roller (36), to allow the support bar (38) and the tappet roller (36) to move in relation to each other when the locking device (51) is set in a locking position and the tappet roller (36) engages the second section (34b) of the cam (34).

17. A feeding assembly to fill capsules (2) or the like with at least two products, each capsule (29) comprising a respective bottom (3) and a respective lid (4) to close the bottom (3), the feeding assembly comprising:
a first containing tank (14), which is capable of housing, on the inside, a first product, has an annular shape, is mounted so as to rotate around a rotation axis (6), and is delimited by a bottom wall (16) provided with a plurality of first filling holes (22) uniformly distributed around the rotation axis (6); and a pocket conveyor (11) to move forward, in sequence, a plurality of said bottoms (3) in phase,
a second containing tank (15), which is capable of housing, on the inside, a second product, has an annular shape that is concentric to the first containing tank (14), is mounted so as to rotate around the rotation axis (6), and is delimited by a bottom wall (17) provided with a plurality of second filling holes (23), which are uniformly distributed around the rotation axis (6);
each of said second filling holes defining, together with a corresponding first filling hole (22), a pair (24) of filling holes (22, 23); and, for each pair (24) of filling holes (22, 23), a respective shutter (31), which is selectively movable between a closing position of both the filling holes (22, 23), a first opening position of the first filling hole (22), and a second opening position of the second filling hole (23);

and wherein said assembly includes an operating device to move the shutters (31) between the relative closing positions and the relative first and second opening position wherein the operating device comprises a cam (34) and, for each shutter (31), a respective tappet (35) engaged in the cam (34);

wherein each tappet (35) comprises a support bar (38) mounted transversally to the rotation axis (6), and a tappet roller (36), which has a longitudinal axis (37) parallel to the rotation axis (6), is mounted through the support bar (38), and is engaged in the cam (34);

wherein the support bar (38) has a hole (40) engaged in a sliding manner by the tappet roller (36);

wherein the cam (34) comprises a first section (34a) to move the shutters (31) into their second opening positions and a second section (34b) to move the shutters (31) into their first opening positions;

and further comprising, for each shutter (31), a respective locking device (51) movable between a locking position of the shutter (31) in its closing position, and a release position; and wherein the support bar (38) has two sleeves (41, 42) obtained from opposite bands of the tappet roller (36) and disposed coaxially to a longitudinal axis (39) of the support bar (38).

18. The feeding device assembly according to claim 17:
wherein a first sleeve (41) of the support bar (38) houses, on its inside, a first spring (45), interposed between the support bar (38) and the shutter (31), to allow the support bar (38) and the shutter (31) to move in relation to each other when said locking device is set in a locking position and the tappet roller (36) engages the first section (34a) of the cam (34).

19. The feeding device assembly according to claim 18:
wherein a second sleeve (42) of the support bar (38) houses, on its inside, a second spring (48), interposed between the support bar (38) and the tappet roller (36), to allow the support bar (38) and the tappet roller (36) to move in relation to each other when said locking device is set in a locking position and the tappet roller (36) engages the second section (34b) of the cam (34).

* * * * *